(12) United States Patent
Lambertson, Jr. et al.

(10) Patent No.: US 9,328,755 B2
(45) Date of Patent: May 3, 2016

(54) EXTENSION POLE MECHANISM FOR PAINT ROLLER

(71) Applicant: The Sherwin-Williams Company, Cleveland, OH (US)

(72) Inventors: Michael C. Lambertson, Jr., Aurora, OH (US); Rita Forman-House, Avon Lake, OH (US); Dennis P. De Renzo, Jr., Concord Township, OH (US); Michael O'Banion, West Minister, MD (US)

(73) Assignee: The Sherwin-Williams Company, Cleveland ( * ) Notice: Subject to any disclaimer, the term of this patent is extended or adjusted under 35 U.S.C. 154(b) by 124 days.

(21) Appl. No.: 13/834,879

(22) Filed: Mar. 15, 2013

(65) Prior Publication Data

US 2014/0301770 A1 Oct. 9, 2014

(51) Int. Cl.
*B05C 17/02* (2006.01)
*B25G 1/04* (2006.01)
*F16B 7/04* (2006.01)
*F16B 7/14* (2006.01)

(52) U.S. Cl.
CPC ............... *F16B 7/14* (2013.01); *B05C 17/0205* (2013.01); *B25G 1/04* (2013.01); *F16B 7/042* (2013.01); *Y10T 403/32501* (2015.01); *Y10T 403/595* (2015.01); *Y10T 403/599* (2015.01); *Y10T 403/602* (2015.01)

(58) Field of Classification Search
CPC ...... B25G 1/04; B25G 1/102; B05C 17/0205; E04H 12/182; F16B 7/0406; F16B 7/0413; F16B 7/042; F16B 7/105; F16B 7/14; F16B 7/1418; F16B 7/1454

USPC .......... 403/109.1–109.3, 109.5, 109.7, 109.8, 403/322.3, 322.4, 325, 327, 377; 81/177.2; 16/427, 429

See application file for complete search history.

(56) References Cited

U.S. PATENT DOCUMENTS

| 2,806,723 | A | | 6/1955 | Fairclough |
| 3,596,946 | A | | 8/1971 | Burton et al. |
| 5,288,161 | A | * | 2/1994 | Graves et al. ............... 403/325 |
| 5,595,410 | A | | 1/1997 | Wilson et al. |
| 6,869,112 | B2 | | 3/2005 | Guidetti |

(Continued)

FOREIGN PATENT DOCUMENTS

| EP | 2387934 A1 | 11/2011 |
| GB | 2413518 A | 11/2005 |

OTHER PUBLICATIONS

International Search Report for International Patent Application No. PCT/US2014/025405 mailed Jul. 23, 2014.

(Continued)

*Primary Examiner* — Josh Skroupa
(74) *Attorney, Agent, or Firm* — Daniel A. Sherwin; James C. Scott; Vivien Y. Tsang

(57) ABSTRACT

An extendable pole mechanism may be used with a pair of poles that are longitudinally movable to adjust the overall length of both poles. The mechanism may include a housing that receives the poles and a trigger that is moveable with respect to the housing to adjust the mechanism between a use condition, where the poles are held in a longitudinally relative fixed position, and an adjustment condition, where the poles are longitudinally moveable with respect to each other.

20 Claims, 13 Drawing Sheets

(56) References Cited

U.S. PATENT DOCUMENTS

| | | | |
|---|---|---|---|
| 7,222,892 B2 | 5/2007 | Guidetti | |
| 7,293,934 B1 * | 11/2007 | Huang | 403/109.1 |
| 8,128,306 B2 * | 3/2012 | Gorza | 403/109.3 |
| 8,875,350 B2 | 11/2014 | Bukovitz | |
| 2010/0258701 A1 * | 10/2010 | Foreman | 248/408 |
| 2012/0107037 A1 * | 5/2012 | Huang | 403/109.3 |
| 2013/0185945 A1 * | 7/2013 | Wang | 30/341 |

OTHER PUBLICATIONS

International Preliminary Report on Patentability for International Patent Application No. PCT/US2014/025405 completed Jan. 22, 2015.

Office Action issued Jan. 6, 2015 for U.S. Appl. No. 14/268,718.

* cited by examiner

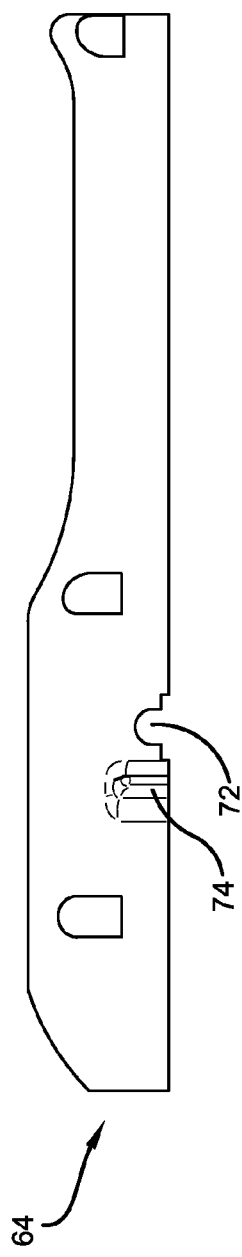
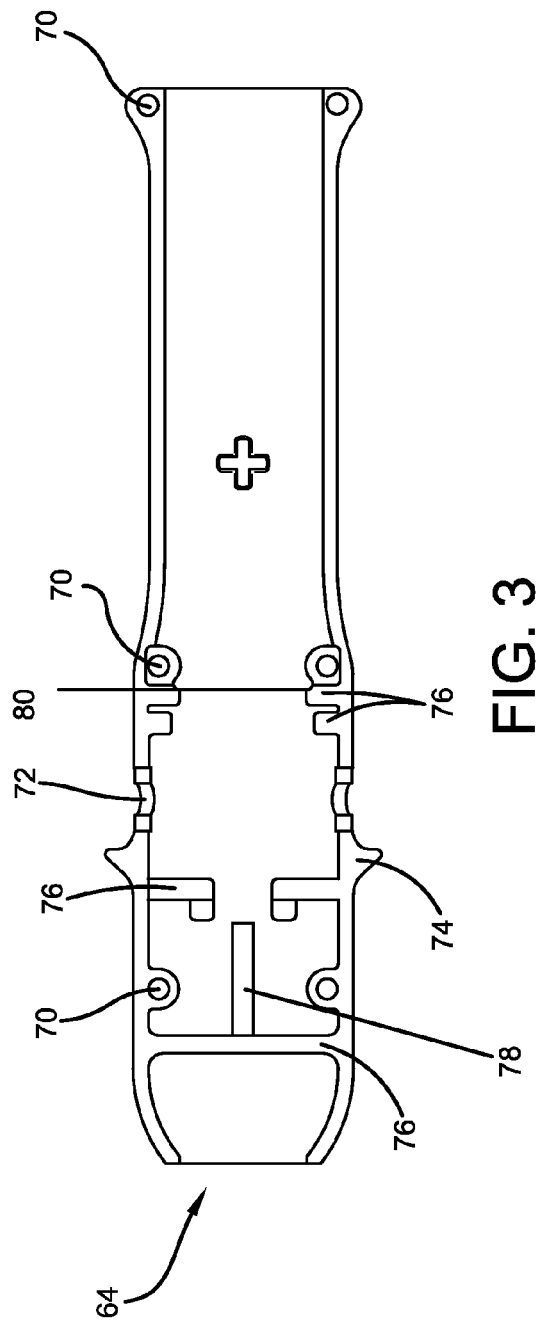

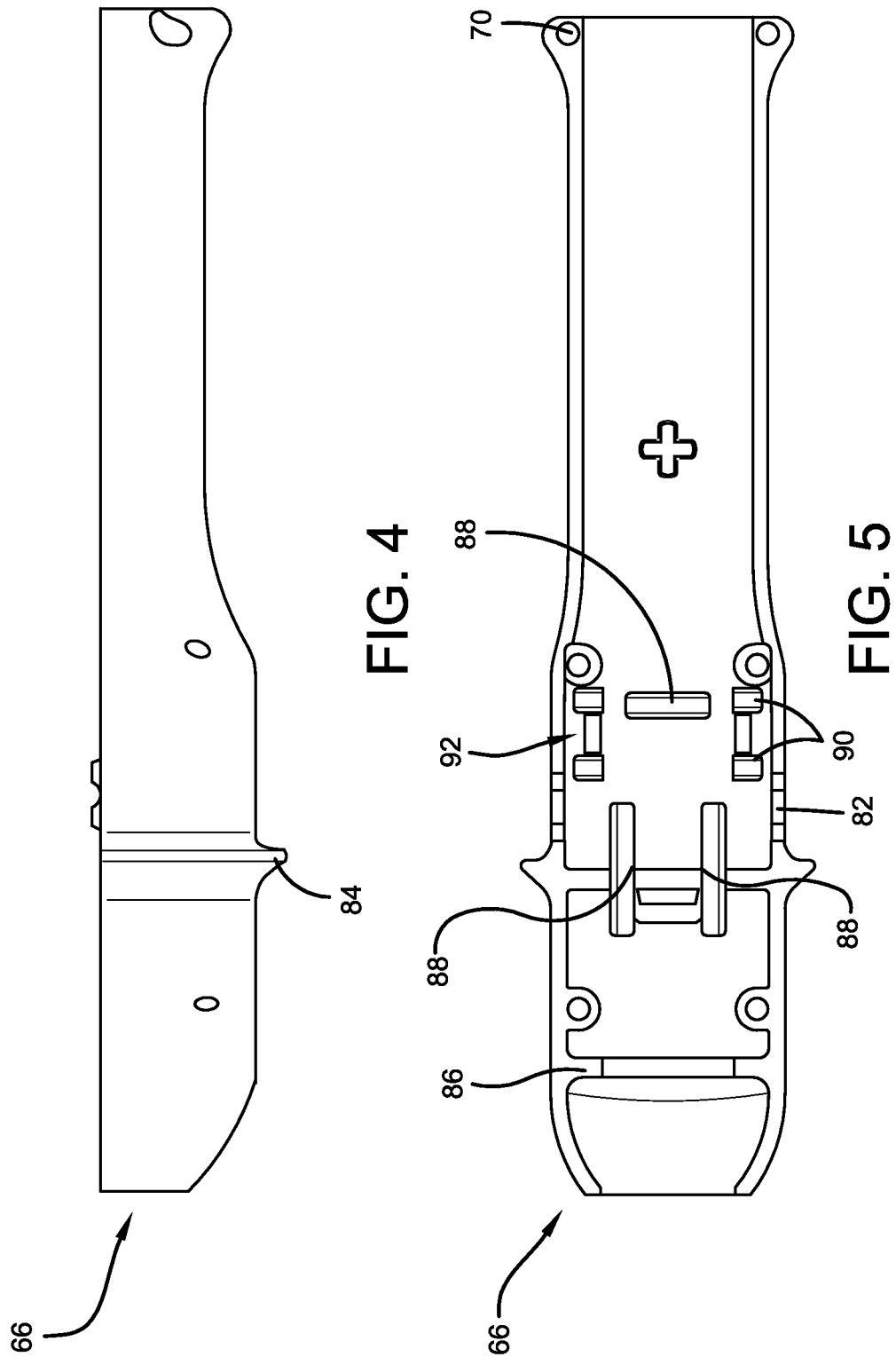

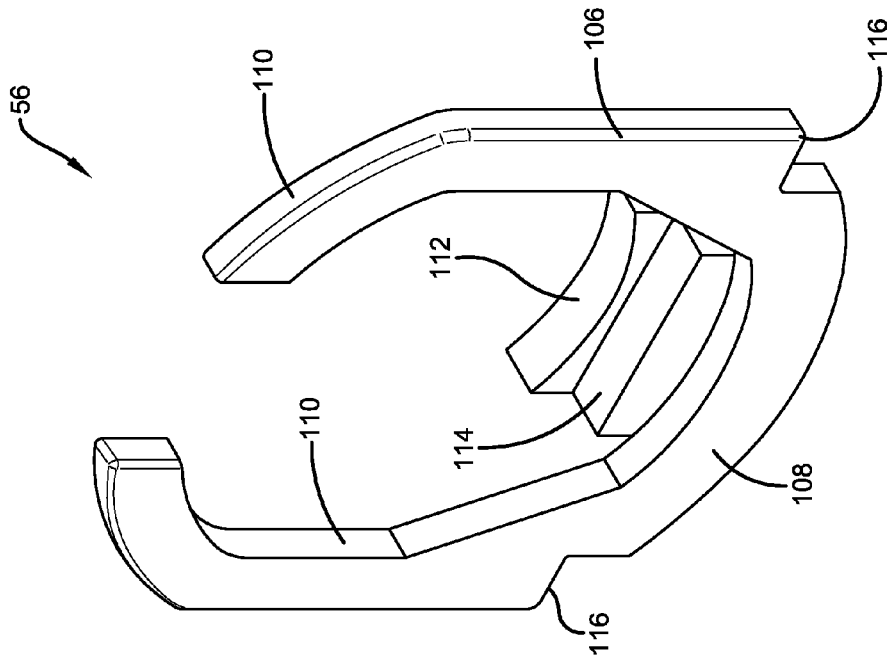
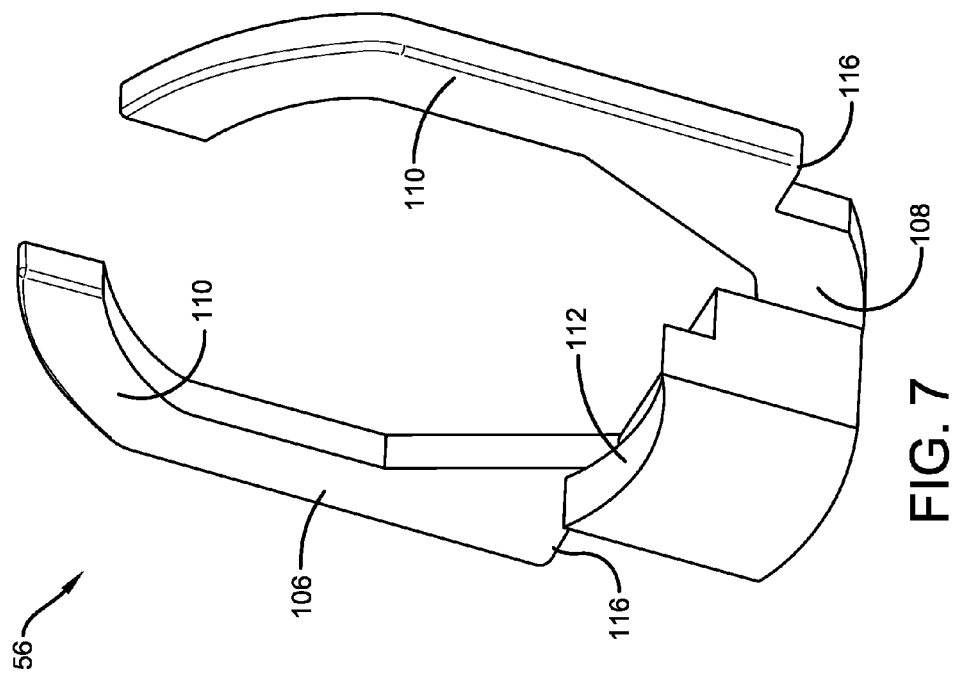

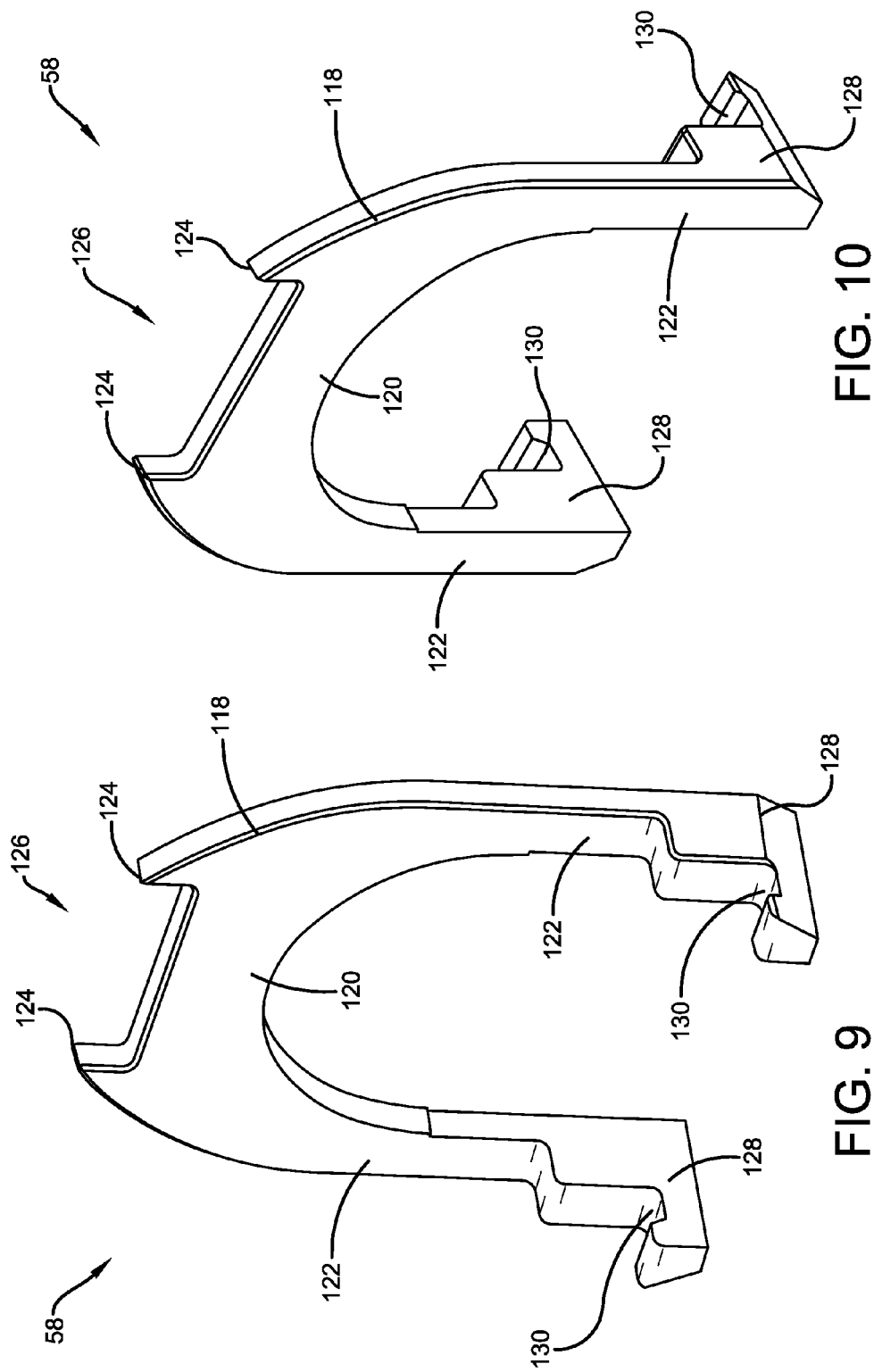

EXTENSION POLE MECHANISM FOR PAINT ROLLER

I. BACKGROUND

A. Field of the Invention

This invention is in the field of methods and apparatuses for extending and contracting the length of poles used with paint related accessories and more specifically to methods and apparatuses for an extendable pole mechanism that is easily adjusted between a use condition and an adjustment condition with one hand.

B. Description of Related Art

It is well known in the paint industry to provide adjustable length poles that are designed to connect to and disconnect from paint accessories. A painter, for example, requires the pole holding a paint roller to be at a relatively shorter length when painting a surface at waist height but to be at a relatively longer length when painting a surface far above his/her head. Known adjustable length poles, however, have disadvantages.

One disadvantage to known adjustable length poles is that they are difficult and time consuming to use. Some, for example, require two hands to adjust. Another disadvantage is that they easily come "loose" from their setting, causing the poles to change their length when such change is not desirable. Yet another disadvantage is that many adjustable length poles are only adjustable in discrete length increments. Still another disadvantage is that known adjustable length poles quickly wear out, increasing costs.

What is needed, then, is an extendable pole mechanism that eliminates or reduces the disadvantages just described. Painters would benefit from using an extendable pole mechanism that is durable, remains in its setting, provides infinite length adjustment, and can be easily operated with one hand.

II. SUMMARY

According to one embodiment of this invention, an extendable pole mechanism may be used with a first associated pole that is longitudinally movable with respect to a second associated pole to adjust the overall length of both poles. The extendable pole mechanism may comprise: a housing that receives the first and second associated poles; a push member that: (1) is supported to the housing; and, (2) is moveable with respect to the housing; a trigger that: (1) is supported to the housing; (2) is moveable with respect to the housing; and, (3) contacts the push member; and, a cam lever that: (1) is supported to the housing; (2) is moveable with respect to the housing; and, (3) contacts the push member. The extendable pole mechanism may be adjustable by moving the trigger with respect to the housing, to cause the push member to move with respect to the housing, to cause the cam lever to move with respect to the housing between: (1) a use condition where the first associated pole is held by contact with the cam lever in a longitudinally fixed position with respect to the second associated pole; and, (2) an adjustment condition where: (a) the first associated pole is not held by contact with the cam lever in a longitudinally fixed position with respect to the second associated pole; and, (b) the first associated pole is longitudinally moveable with respect to the second associated pole.

According to another embodiment of this invention, a method may comprise the steps of: (A) providing an extendable pole mechanism for use with a first pole that is longitudinally movable with respect to a second pole; the extendable pole mechanism comprising: (1) a housing that receives the first and second poles; (2) a push member that: (a) is supported to the housing; and, (b) is moveable with respect to the housing; (3) a trigger that: (a) is supported to the housing; (b) is moveable with respect to the housing; and, (c) contacts the push member; and, (4) a cam lever that: (a) is supported to the housing; (b) is moveable with respect to the housing; and, (c) contacts the push member; and, (B) adjusting the extendable pole mechanism by moving the trigger with respect to the housing, to cause the push member to move with respect to the housing, to cause the cam lever to move with respect to the housing from: (1) a use condition where the first pole is held by contact with the cam lever in a longitudinally fixed position with respect to the second pole; into, (2) an adjustment condition where: (a) the first pole is not held by contact with the cam lever in a longitudinally fixed position with respect to the second pole; and, (b) the first pole is longitudinally moveable with respect to the second pole to adjust the overall length of both poles.

According to yet another embodiment of this invention, an extendable pole mechanism may comprise: a first pole that is longitudinally movable with respect to a second pole to adjust the overall length of both poles; a housing that receives the first and second poles; a push member that: (1) is positioned within the housing; and, (2) is moveable with respect to the housing; a trigger that: (1) is supported to the housing; (2) is moveable with respect to the housing; (3) has a mid-section that is positioned outside the housing; and, (4) contacts the push member; a cam lever that: (1) is positioned within the housing; (2) is moveable with respect to the housing; (3) has a first surface that contacts the push member; and, (4) has a second surface; and, a cam holder that: (1) is positioned within the housing; and, (2) comprises a first contact surface that contacts the second surface of the cam lever. The extendable pole mechanism may be adjustable by moving the trigger with respect to the housing, to cause the push member to slide with respect to the housing, to cause the cam lever to pivot about its second surface on the first contact surface of the cam holder with respect to the housing between: (1) a use condition where the first pole is held by direct contact with the cam lever in a longitudinally fixed position with respect to the second pole; and, (2) an adjustment condition where: (a) the first pole is not held by contact with the cam lever in a longitudinally fixed position with respect to the second pole; and, (b) the first pole is longitudinally moveable with respect to the second pole Numerous benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 2 is a side view of a first housing portion.

FIG. 3 is a bottom view of the first housing portion shown in FIG. 2.

FIG. 4 is a side view of a second housing portion.

FIG. 5 is a top view of the second housing portion shown in FIG. 4.

FIG. 7 is a first side perspective view of a cam lever.

FIG. 8 is a second side perspective view of the cam lever shown in FIG. 7.

FIG. 9 is a first side perspective view of a cam holder.

FIG. 10 is a second side perspective view of the cam holder shown in FIG. 9.

IV. DETAILED DESCRIPTION

Figure 1:
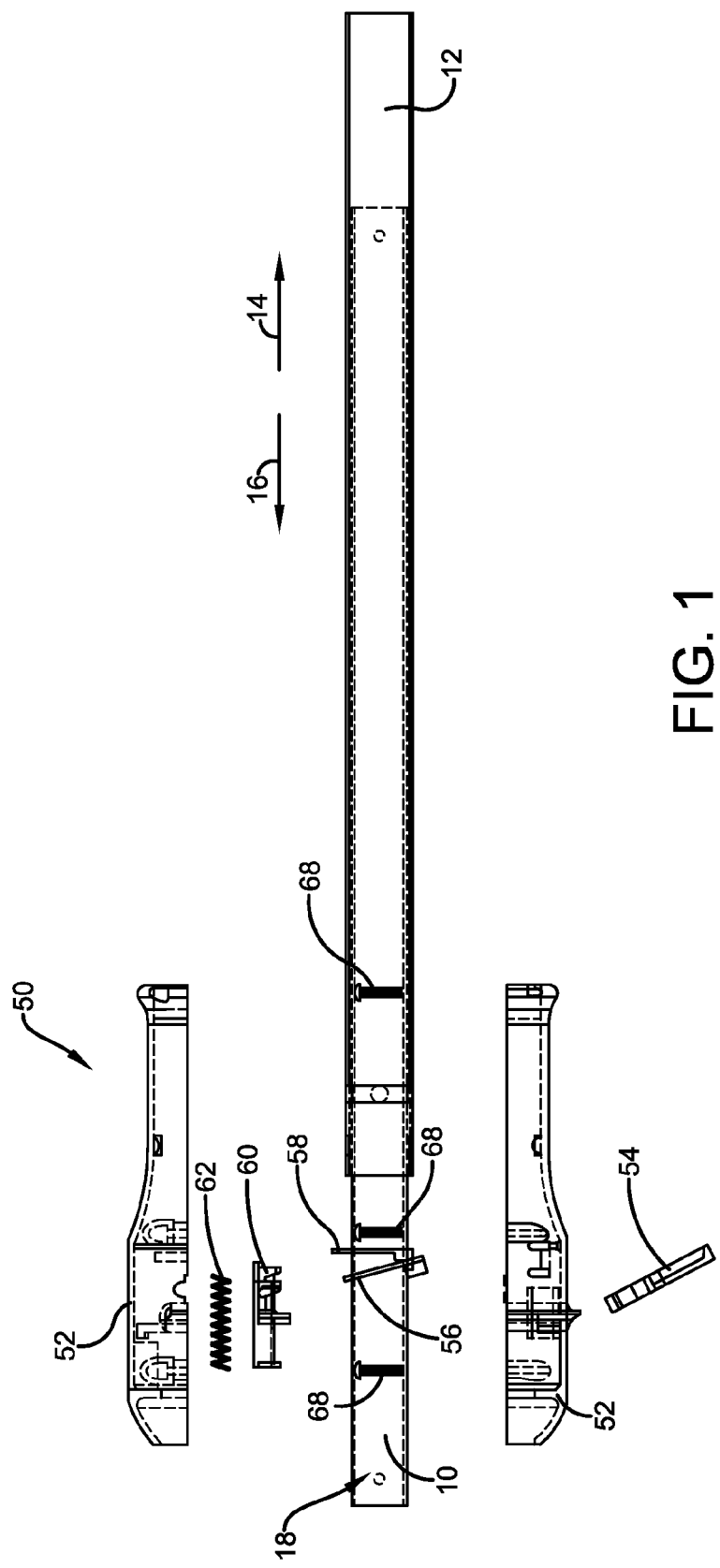
FIG. 1 is a side assembly view of an extendable pole mechanism according to some embodiments of this invention.
Figure 17:
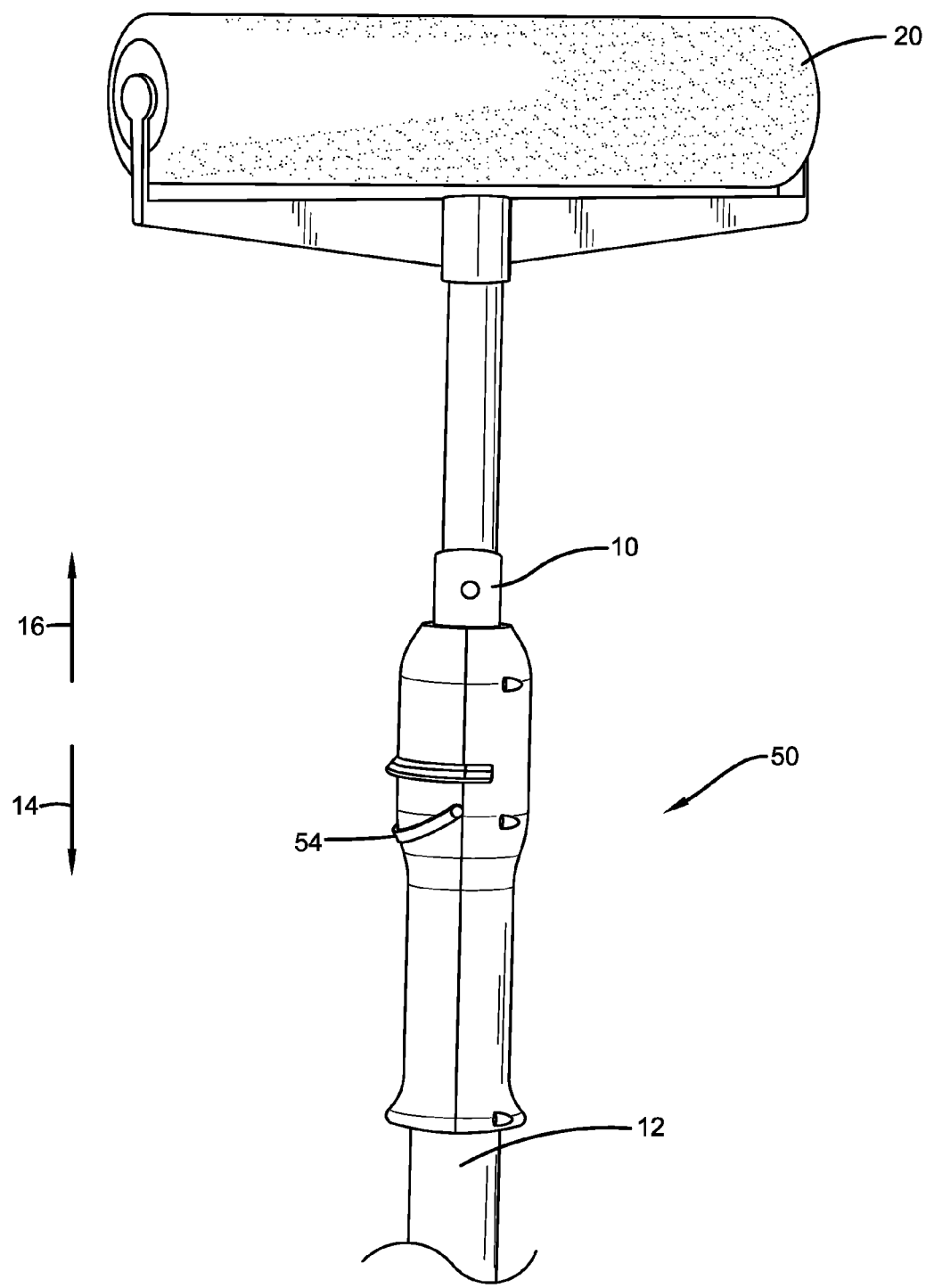
FIG. 17 is a side perspective view of the extendable pole mechanism connected to a point roller according to some embodiments of this invention

Referring now to the drawings wherein the showings are for purposes of illustrating embodiments of the invention only and not for purposes of limiting the same, and wherein like reference numerals are understood to refer to like components, FIGS. 1 and 17 show a pair of poles 10, 12 that can be used with the extendable pole mechanism 50 of this invention. While the extendable pole mechanism 50 is ideally suited for use with paint accessories and the like, such as the paint roller 20 shown in FIG. 17, it is not limited to that application. Pole 10 may have an outside diameter that is received within an inside diameter of pole 12. As a result, pole 10 is slideable within pole 12 (and with respect to pole 12) in first direction 14 and second direction 16. When pole 10 is slid in direction 14, the overall length of both poles is decreased. When pole 10 is slid in direction 16, the overall length of both poles is increased. Thus, a user can adjust the overall length of the poles by sliding pole 10 with respect to pole 12. Pole 10 may have a connection site 18 to which a paint accessory, such as paint roller 20, can be attached. Pole 12 and/or the housing may serve as a handle for the user. In one specific embodiment, pole 10 is made of aluminum and pole 12 is made of fiberglass to provide good performance.

With reference now to FIG. 1, the extendable pole mechanism 50 may be adjusted between a use condition, where pole 10 is held in a longitudinally fixed position with respect to pole 12, and an adjustment condition, where pole 10 can slide longitudinally with respect to pole 12 so that the overall length can be changed. The extendable pole mechanism 50 may include a housing 52, a trigger 54, a cam lever 56, a cam holder 58, a push member 60, and a biasing device 62, which may be a spring, as shown. These components will now be described in more detail.

With reference now to FIGS. 1-5, the housing 52 may have first and second portions 64, 66 that receive portions of poles 12 and 14, as shown, and may be attached to each other using connectors 68 received in openings 70. While six threaded connectors are used in the embodiment shown, the number and type can be any chosen with the sound judgment of a person of skill in the art. The first housing portion 64 may include shaft receiving grooves 72, an external protection ring 74, internal lateral extensions 76 and an internal longitudinal extension 78. A groove 80 may be formed between some of the lateral extensions 76, as shown. The external protection ring 74 shown only extends a small amount around the external surface of the portion 64. The second housing portion 66 may include shaft receiving grooves 82 and an external protection ring 84 that may extend all the way around the external surface of the portion 66, as shown. The second housing portion 66 may have internal lateral extensions 86 and pole contact surfaces 88. Extensions 90 may define grooves 92 between them, as shown. The purposes for these components will be discussed below.

Figure 6:
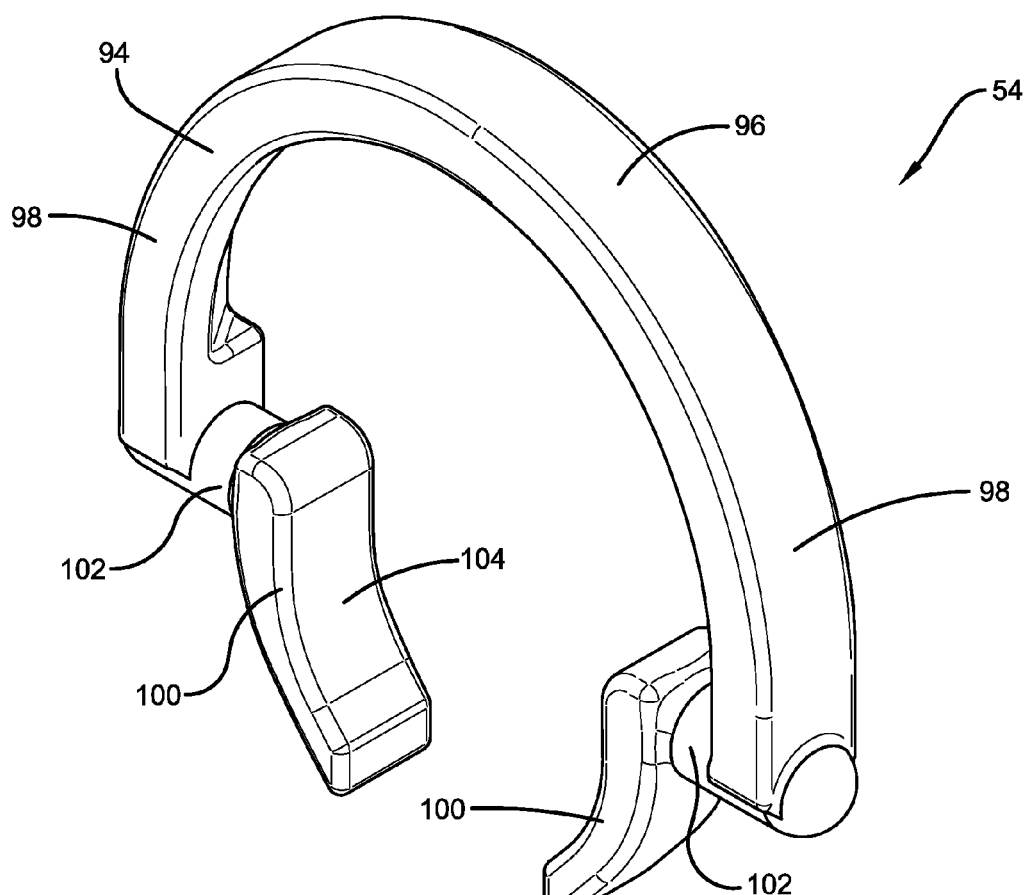
FIG. 6 is a perspective view of a trigger.
Figure 11:
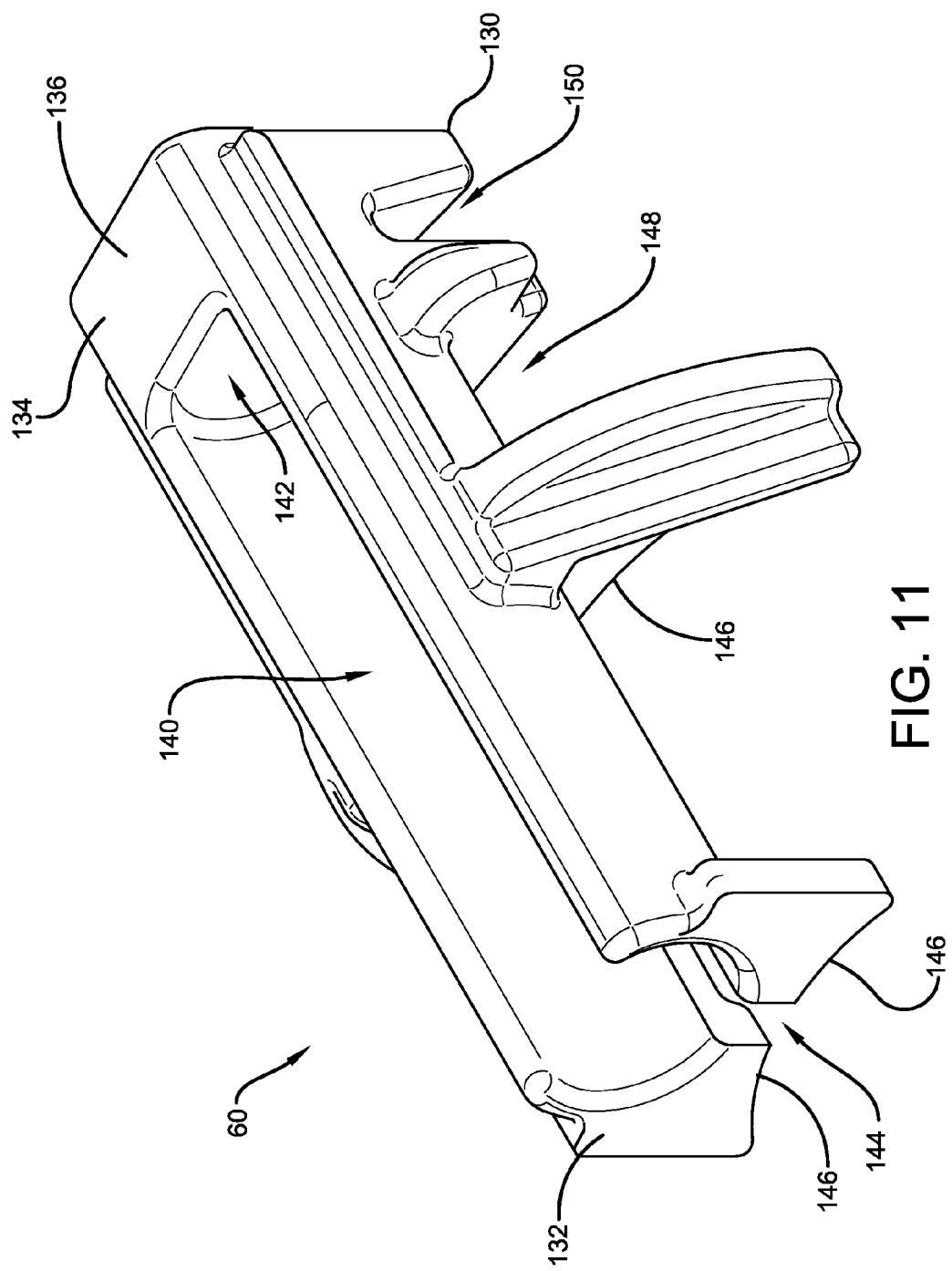
FIG. 11 is a top perspective view of a push member.
Figure 12:
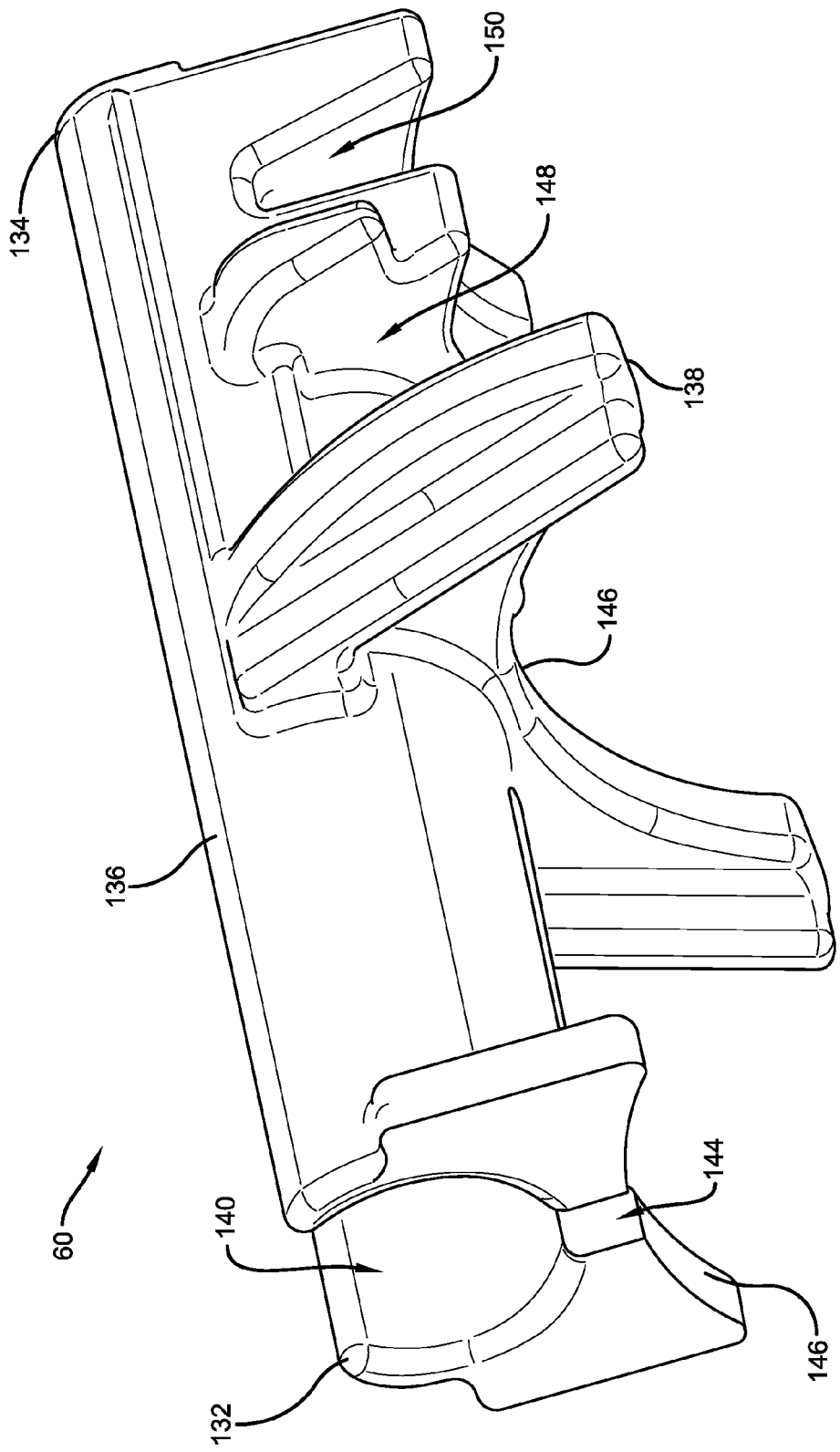
FIG. 12 is a bottom perspective view of the push member shown in FIG. 11.
Figure 13:
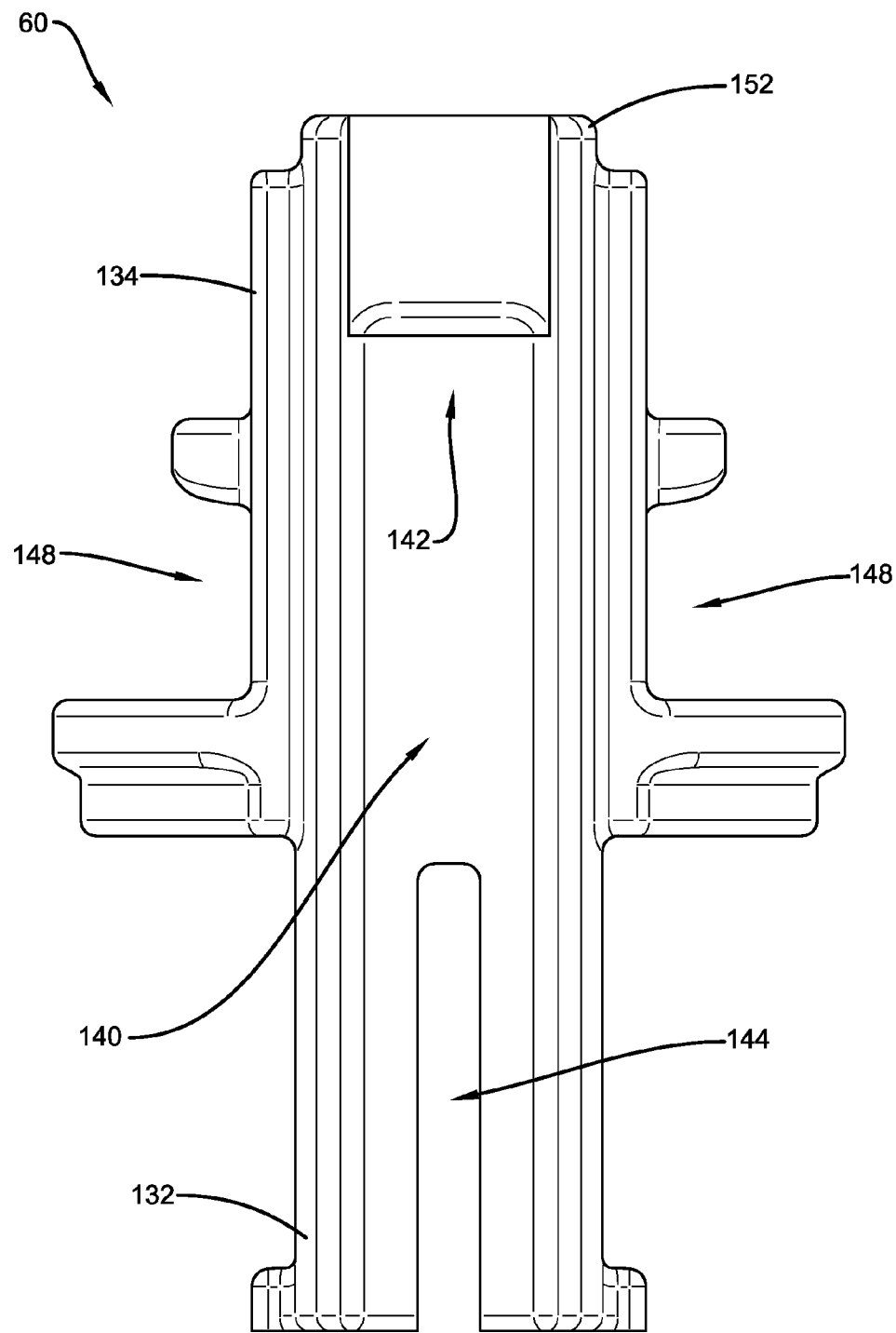
FIG. 13 is a top view of the push member shown in FIG. 11.
Figure 14:
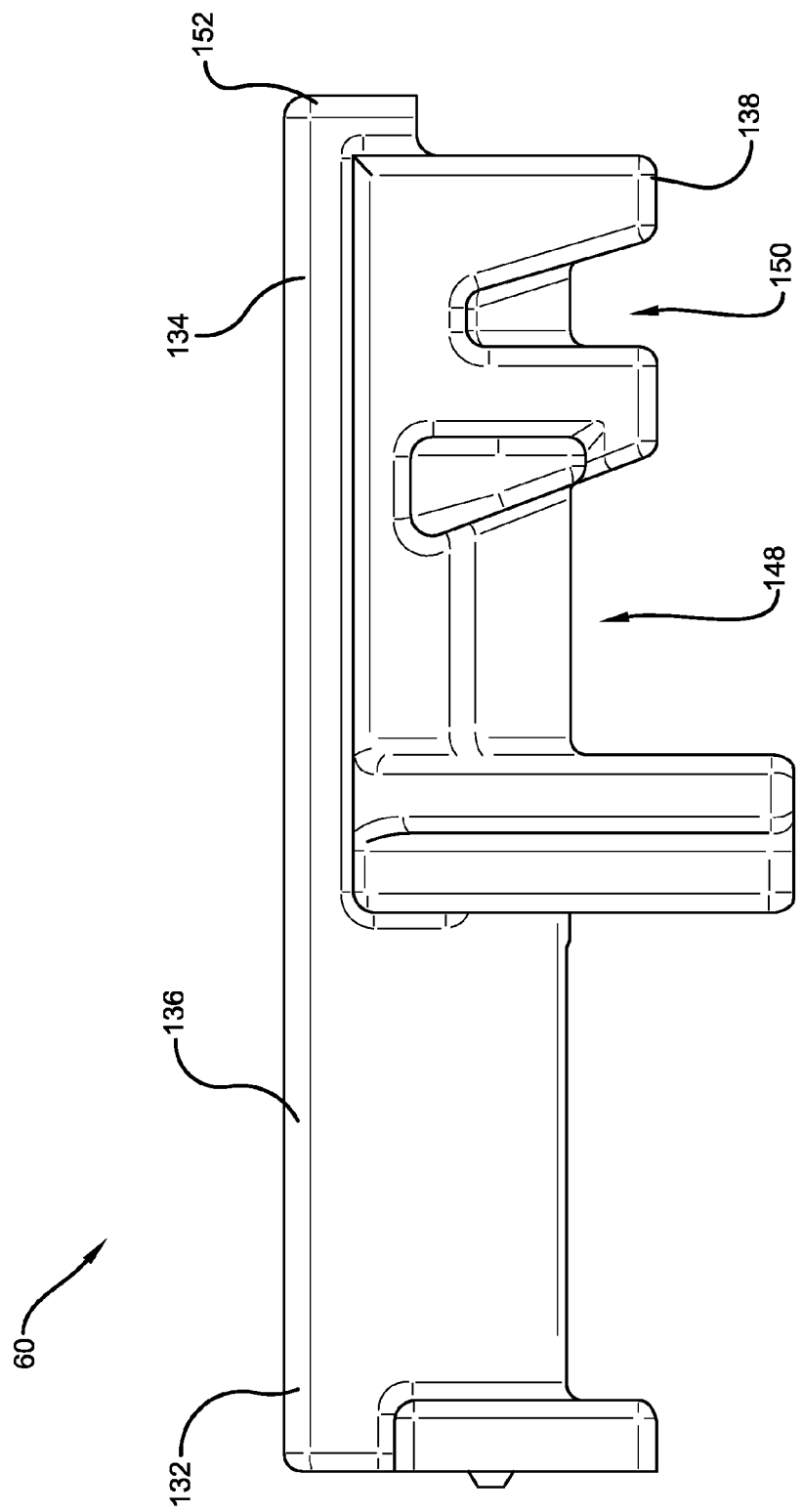
FIG. 14 is a side view of the push member shown in FIG. 11.

With reference now to FIGS. 1 and 6, the trigger 54 may have a body 94 having a mid-section 96 and a pair or arms 98, 98 extending from the mid-section 96. For the embodiment shown, the body 94 is C-shaped. A pair of hands 100, 100 may extend from distal ends of the arms 98, 98, as shown. The hands 100, 100 may extend inwardly and may have curved inner surfaces 104, as shown. A pair of shaft portions 102, 102 may extend from the distal ends of the arms 98, 98. For the embodiment shown, the hands 100, 100 are attached to the shaft portions 102, 102 and extend inwardly therefrom. The trigger 54 may be formed of any material chosen with the sound judgment of a person of skill in the art. In one embodiment, the trigger 54 is made of plastic and in another it is made of a metal.

With reference now to FIGS. 1 and 7-8, the cam lever 56 may have a body 106 having a mid-section 108 and a pair of arms 110, 110 extending from the mid-section 108. For the embodiment shown, the body 106 is C-shaped. First and second surfaces 112, 114 may extend longitudinally from the mid-section 108 as shown. The first surface 112 may extend above the second surface 114 and may be curved, as shown, to match the outside diameter of pole 10. Shoulder surfaces 116, 116, may be formed at proximal ends of the arms 110, 110 and the distal ends of the arms 110, 110 may curve inwardly, as shown. The cam lever 56 may be formed of any material chosen with the sound judgment of a person of skill in the art.

With reference now to FIGS. 1 and 9-10, the cam holder 58 may have a body 118 having a mid-section 120 and a pair or arms 122, 122 extending from the mid-section 120. For the embodiment shown, the body 118 is C-shaped. A pair of surfaces 124, 124 may define with the mid-section 120 a groove 126 on the external surface of the mid-section 120, as shown. Hands 128, 128 may extend longitudinally from distal ends of the arms 122, 122, as shown. Contact surfaces 130, 130 may be defined on the hands 128, 128. The contact surfaces 130, 130 may be J-shaped, as shown. The cam holder 58 may be formed of any material chosen with the sound judgment of a person of skill in the art.

With reference now to FIGS. 1 and 11-14, the push member 60 may have first and second ends 132, 134, a top 136 and a bottom 138. A chamber 140 may be provided on the top 136, first end 132 and may receive the biasing device 62 shown in FIG. 1. The chamber 140 may be defined by a wall 142 at one end and may have a generally cylindrical shape, as shown. A slot 144 may be formed in a surface defining the bottom of the chamber 140 and may extend from the first end 132 toward the mid-section of the push member 60. Pole contact surfaces 146, 146 may extend from the bottom 138 and may be curved, as shown, to match the outside diameter of pole 10. Grooves 148, 148 may be formed on sides of the push member 60 and a groove 150 may be formed on the bottom 138 of the push member 60, as shown. The second end 134 may have an extension 152. The push member 60 may be formed of any material chosen with the sound judgment of a person of skill in the art.

Figure 15:
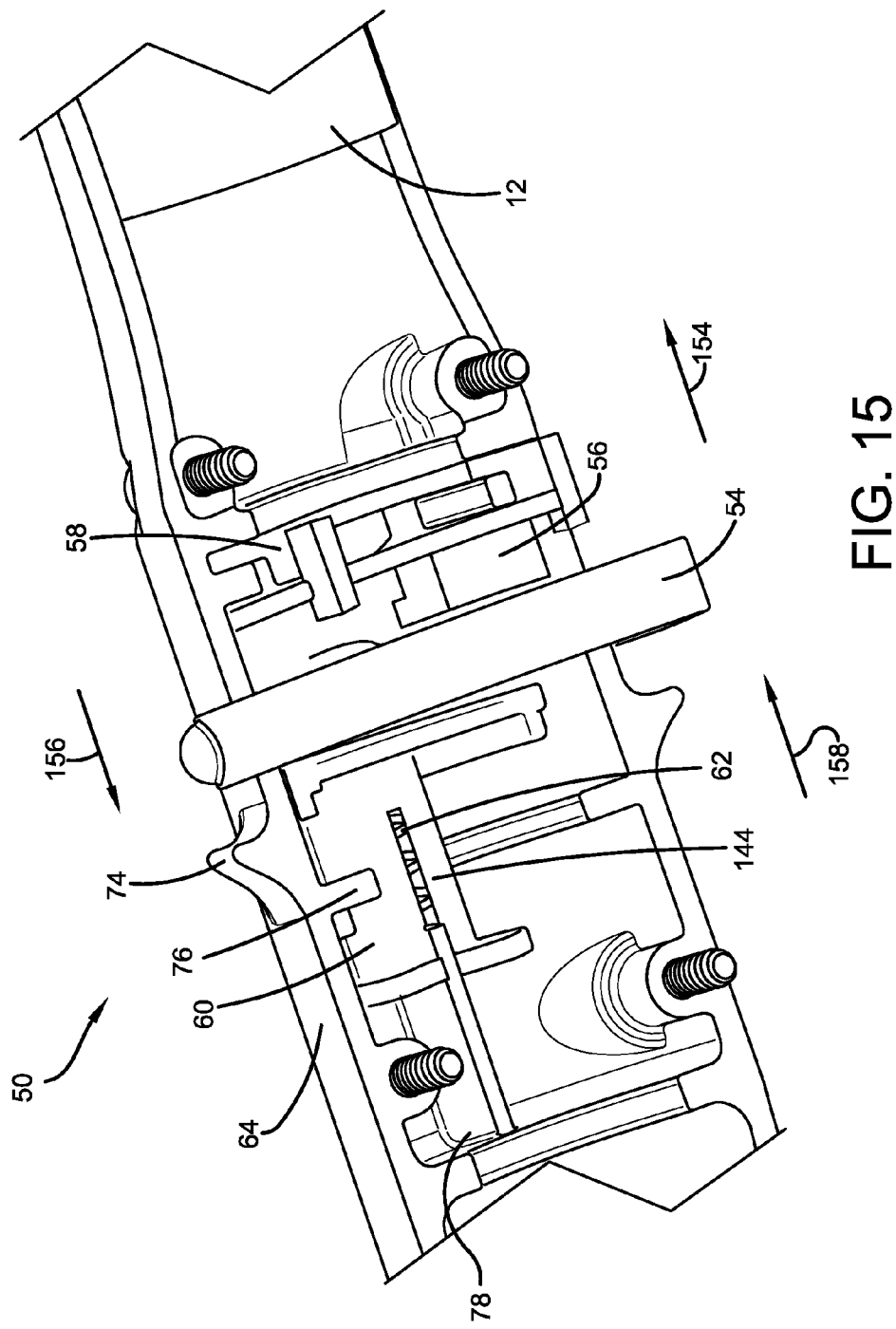
FIG. 15 is a bottom perspective view of the extendable pole mechanism in a use condition with the first pole and a portion of the housing hidden.
Figure 16:
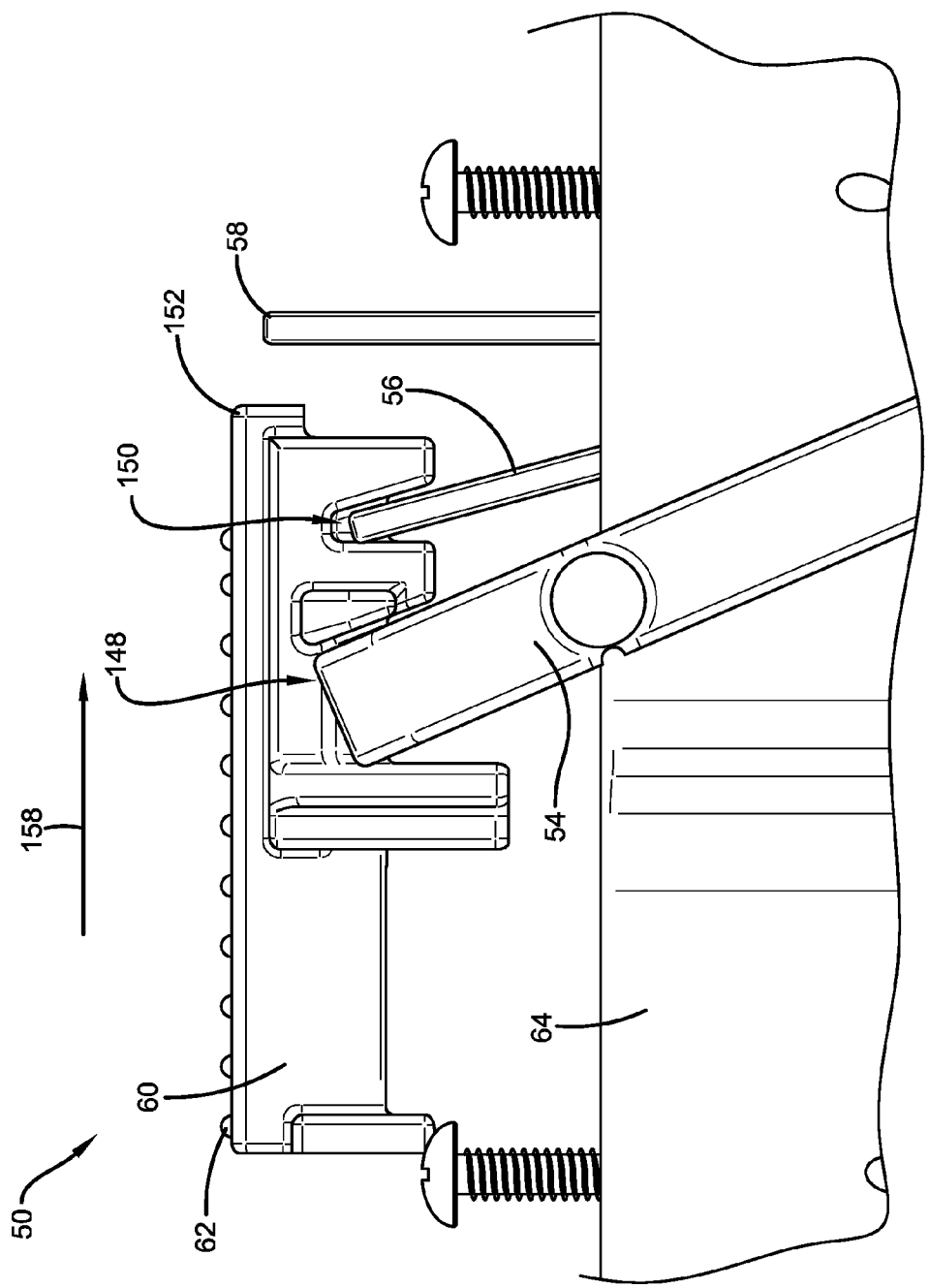
FIG. 16 is a side view of the extendable pole mechanism in an adjustment condition with the first pole and a portion of the housing hidden.

The assembly of the extendable pole mechanism 50 will now be described. The poles 10, 12 may be received in the housing portions 64, 66 as shown in FIGS. 1, 15 and 17. The push member 60 may be positioned primarily within the housing portion 64, between lateral extensions 76, as shown in FIG. 15, and the slot 144 may receive the extension 78. The pole contact surfaces 146 may receive the outer surface of the pole 10, though pole 10 is hidden in FIGS. 15 and 16. With reference to FIGS. 2-6 and 15-16, the shaft portions 102 of the trigger 54 may be received in the shaft receiving grooves 72 and 82 of the respective housing portions 64, 66. The hands 100 of the trigger 54, see FIG. 6, may be positioned within the grooves 148 formed on the push member 60, as seen in FIG. 16. The pole 10 may be received between the arms 98 of the trigger 54 and the mid-section 96 and arms 98 of the trigger 54 may be positioned outside the housing 52. The cam holder 58 may be positioned within the housing 52 with the mid-section 120, see FIGS. 9-10, received in the groove 80, see FIG. 3, formed in the first housing portion 64. This is shown in FIG. 15. The pole 10 may be received between the arms 122 of the cam holder 58. The hands 128 of the cam holder 58, see FIGS. 9-10, may be received in the grooves 92, 92, see FIG. 5, formed in the second housing portion 66. The cam holder 58 thus may be held substantially fixed throughout the operation of the extendable pole mechanism 50. This is shown in FIGS. 15 and 16. The cam lever 56 may be positioned within the housing 52 with the distal ends of the arms 110, 110, see FIGS. 7-8, received in the groove 150 formed on the push member 60, as shown in FIG. 16. The pole 10 may be received between the arms 110 of the cam lever 56. The shoulder surfaces 116, 116, see FIGS. 7-8, may be received on the contact surfaces 130 on the cam holder 58, see FIGS. 9-10 and 15.

With the extendable pole mechanism 50 assembled as described above, its operation will now be described. FIG. 15 shows the extendable pole mechanism 50 in the use condition where pole 10 is held in a longitudinally fixed position with respect to pole 12. This is generally the preferred condition for using the poles while painting, for example. In this use condition, the pole 10 is received between the arms 98 of the trigger 54, the arms 110 of the cam lever 56, and the arms 122 of the cam holder 58. Note that the arms 98 of the trigger 54, the arms 110 of the cam lever 56, and the arms 122 of the cam holder 58 are substantially parallel with each other and substantially perpendicular to the longitudinal axes of the poles 10, 12. Note also that the extension 152, see FIGS. 13-14 and 16, of the push member 60 may be received in the groove 126, see FIGS. 9-10, in the cam holder 58. In this use condition, the bottom of the pole 10 rests securely on the first surface 112 of the cam lever 56, see FIGS. 7-8.

To adjust the extendable pole mechanism 50 into the adjustment condition, shown in FIGS. 16 and 17, all the user has to do is move the mid-section of the trigger 54 in direction 154 shown in FIG. 15. This can easily be done with a single finger, perhaps the user's thumb. This motion causes the trigger 54 to pivot about its shaft portions 102, see FIG. 6. As the trigger 54 is pivoted, the hands 100 within the grooves 148 of the push member 60 push/slide the push member 60 in direction 156, shown in FIG. 15. As the push member 60 is moved in direction 156, the biasing force of the spring 62 is overcome as the extension 78 is received farther into the slot 144. Movement of the push member 60 in direction 156 also causes the distal ends of the arms 110, see FIGS. 7-8, which are received in groove 150 to move in direction 156. As the arms 110 move in this way, the shoulder surfaces 116, see FIGS. 7-8, pivot on the contact surfaces 130, see FIGS. 9-10, of the cam holder 58 (and thus with respect to the cam holder). This movement of the trigger 54, and thus the push member 60 and cam lever 56, may be continued until the adjustment condition shown in FIG. 16 is achieved.

With the extendable pole mechanism 50 in the adjustment condition shown in FIGS. 16 and 17, the pole 10 remains between the arms 98 of the trigger 54, the arms 110 of the cam lever 56, and the arms 122 of the cam holder 58. The arms of the trigger 54 and the cam lever 56, however, are no longer parallel with the arms of the cam holder 58 and are no longer perpendicular to the longitudinal axes of the poles 10, 12. In this adjustment condition, the bottom of the pole 10 contacts first and second surfaces 112, 114, see FIGS. 7-8, of the cam lever 56 and the pole contact surfaces 88, see FIG. 5, of the second housing portion 66. With the cam lever 56 angled in this manner, room for the pole 10 within the housing 52 is increased, making it very easy to adjust the relative longitudinal positions of the poles 10, 12 by sliding pole 10 with respect to pole 12 to change the overall length. In fact, if the user simply aims the pole 10 toward the ground while holding the housing 52 or the pole 12, gravity will easily cause the pole 10 to slide out of the housing 52 and pole 12 (in direction 16 in FIG. 1), increasing the overall length. Similarly, if the user simply aims the pole 10 toward the sky while holding the housing 52 or the pole 12, gravity will easily cause the pole 10 to slide into the housing 52 and pole 12 (in direction 14 in FIG. 1), decreasing the overall length.

To adjust the extendable pole mechanism 50 from the adjustment condition shown in FIGS. 16 and 17 to the use condition shown in FIG. 15, all the user has to do is release the trigger 54. When the trigger 54 is released, the biasing force of the spring 62 will force/slide the push member 60 in direction 158, shown in FIGS. 15 and 16 until the components return to the relative positions shown in FIG. 15

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. An extendable pole mechanism for use with a first associated pole that is longitudinally movable with respect to a second associated pole to adjust the overall length of both poles, the extendable pole mechanism comprising:
   a housing adapted to receive the first and second associated poles;
   a push member that: (1) is supported in the housing; and, (2) is moveable in a linear direction with respect to the housing;
   a trigger that: (1) is supported in the housing; (2) is moveable with respect to the housing; (3) contacts the push member; and (4) is pivotal with respect to the housing;
   a cam lever that: (1) is supported in the housing; (2) is moveable with respect to the housing; and, (3) contacts the push member; and,
   wherein the extendable pole mechanism is adjustable by pivoting the trigger with respect to the housing, to cause the push member to move with respect to the housing, wherein the cam lever is adapted to move with respect to the housing between: (1) a use condition where the first associated pole is held by contact with the cam lever in a longitudinally fixed position with respect to the second associated pole; and, (2) an adjustment condition where: (a) the first associated pole is not held by contact with the cam lever in a longitudinally fixed position with respect to the second associated pole; and, (b) the first associated pole is longitudinally moveable with respect to the second associated pole.

2. The extendable pole mechanism of claim 1 wherein:
the cam lever comprises: (1) a first surface that contacts the push member; and, (2) a second surface;
the extendable pole mechanism further comprises: a cam holder that: (1) is supported to the housing; and, (2) comprises a contact surface that contacts the second surface of the cam lever; and,
the cam lever pivots about its second surface on the contact surface of the cam holder between the use condition and the adjustment condition.

3. The extendable pole mechanism of claim 1 wherein:
the push member is slidable with respect to the housing;
the cam lever is pivotal with respect to the housing; and,
the extendable pole mechanism is adjustable by pivoting the trigger with respect to the housing, to cause the push member to slide with respect to the housing, to cause the cam lever to pivot with respect to the housing between the use condition and the adjustment condition.

4. The extendable pole mechanism of claim 1 wherein:
the push member has a bottom with a pole contact surface that is adapted to contact an outer surface of the first pole;
the trigger comprises first and second arms wherein the first and second arms are adapted to receive the first associated pole between the first and second arms of the trigger; and,
the cam lever comprises first and second arms wherein the first and second arms are adapted to receive the first associated pole between the first and second arms of the cam lever.

5. The extendable pole mechanism of claim 1 wherein:
the push member is positioned within the housing;
the cam lever is positioned within the housing;
the trigger comprises a mid-section and first and second arms that extend from the midsection; and,
the mid-section and first and second arms of the trigger are positioned outside the housing.

6. The extendable pole mechanism of claim 1 wherein the push member comprises a chamber that receives a spring that biases the extendable pole mechanism toward the use condition.

7. The extendable pole mechanism of claim 6 wherein:
the push member comprises a wall and a slot formed in a surface defining the chamber;
the housing comprises an extension that is received in the slot;
the spring has a first end that contacts the push member wall and a second end that contacts the housing extension.

8. The extendable pole mechanism of claim 1 wherein:
the housing comprises a shaft receiving groove;
the push member comprises a groove; and,
the trigger comprises: (1) a shaft portion: (a) that is received within the shaft receiving groove; and, (b) about which the trigger pivots to cause the push member to move with respect to the housing; and, (2) a hand that: (a) is received in the push member groove; (b) is attached to the shaft portion; and, (c) extends inwardly.

9. The extendable pole mechanism of claim 1 wherein:
the extendable pole mechanism further comprises: a cam holder that: (1) is supported to the housing; and, (2) comprises a contact surface that contacts the cam lever;
the cam lever pivots about the contact surface of the cam holder between the use condition and the adjustment condition; and,
the cam holder comprises a groove that receives an extension of the push lever only when the extendable pole mechanism is in the use condition.

10. A method comprising the steps of:
(A) providing an extendable pole mechanism for use with a first pole that is longitudinally movable with respect to a second pole; the extendable pole mechanism comprising:
  (1) a housing that receives the first and second poles;
  (2) a push member that: (a) is supported to the housing; and, (b) is moveable in a linear direction with respect to the housing;
  (3) a trigger that: (a) is supported to the housing; (b) is moveable with respect to the housing; (c) contacts the push member; and, (d) is pivotal with respect to the housing; and,
  (4) a cam lever that: (a) is supported to the housing; (b) is moveable with respect to the housing; and, (c) contacts the push member; and,
(B) adjusting the extendable pole mechanism by pivoting the trigger with respect to the housing, to cause the push member to move with respect to the housing, to cause the cam lever to move with respect to the housing from:
  (1) a use condition where the first pole is held by contact with the cam lever in a longitudinally fixed position with respect to the second pole; into,
  (2) an adjustment condition where: (a) the first pole is not held by contact with the cam lever in a longitudinally fixed position with respect to the second pole; and, (b) the first pole is longitudinally moveable with respect to the second pole to adjust the overall length of both poles.

11. The method of claim 10 wherein:
step (A) comprises the step of: providing the extendable pole mechanism with a biasing device that biases the position of the push member; and,
after step (B) the method further comprises the step of: adjusting the extendable pole mechanism from the adjustment condition into the use condition by releasing the trigger to cause the push member to move with respect to the housing, to cause the cam lever to move with respect to the housing.

12. The method of claim 10 wherein:
step (A) comprises the steps of: providing the extendable pole mechanism with a cam holder that is supported to the housing and that comprises a contact surface; and, providing the cam lever with a first surface that contacts the push member and a second surface that contacts the contact surface of the cam holder; and,
step (B) comprises the step of: pivoting the cam lever about its second surface on the contact surface of the cam holder between the use condition and the adjustment condition.

13. The method of claim 10 wherein:
step (B) comprises the steps of: pivoting the trigger with respect to the housing to cause the push member to slide with respect to the housing to cause the cam lever to pivot with respect to the housing.

14. The method of claim 10 wherein:
step (A) comprises the steps of: providing the housing with a shaft receiving groove; providing the trigger with a mid-section and an arm that extend from the mid-section; and, providing the trigger with a shaft portion that extends from the arm and that is received within the shaft receiving groove; and,
step (B) comprises the step of: pivoting the trigger with respect to the housing about the shaft portion.

15. An extendable pole mechanism comprising:
a first pole that is longitudinally movable with respect to a second pole to adjust the overall length of both poles;
a housing that receives the first and second poles;
a push member that: (1) is positioned within the housing; and, (2) is moveable in a linear direction with respect to the housing;
a trigger that: (1) is supported in the housing; (2) is moveable with respect to the housing; (3) has a mid-section that is positioned outside the housing; (4) is pivotal with respect to the housing; and, (5) contacts the push member;
a cam lever that: (1) is positioned within the housing; (2) is moveable with respect to the housing; (3) has a first surface that contacts the push member; and, (4) has a second surface;
a cam holder that: (1) is positioned within the housing; and, (2) comprises a first contact surface that contacts the second surface of the cam lever; and,
wherein the extendable pole mechanism is adjustable by pivoting the trigger with respect to the housing, to cause the push member to slide with respect to the housing, to cause the cam lever to pivot about its second surface on the first contact surface of the cam holder with respect to the housing between: (1) a use condition where the first pole is held by direct contact with the cam lever in a longitudinally fixed position with respect to the second pole; and, (2) an adjustment condition where: (a) the first pole is not held by contact with the cam lever in a longitudinally fixed position with respect to the second pole; and, (b) the first pole is longitudinally moveable with respect to the second pole.

16. The extendable pole mechanism of claim 15 wherein:
the push member comprises: (1) a wall; (2) a chamber that receives a spring; and, (3) a slot formed in a surface defining the chamber;
the housing comprises an extension that is received in the slot; and,
the spring has a first end that contacts the push member wall and a second end that contacts the housing extension to bias the extendable pole mechanism toward the use condition.

17. The extendable pole mechanism of claim 16 wherein:
the push member has a bottom with a pole contact surface that contacts an outer surface of the first pole;
the trigger comprises first and second arms and the first pole is received between the first and second arms of the trigger;
the cam lever comprises first and second arms and the first pole is received between the first and second arms of the cam lever; and,
the cam holder comprises first and second arms and the first pole is received between the first and second arms of the cam holder.

18. The extendable pole mechanism of claim 17 wherein:
the housing comprises first and second shaft receiving grooves;
the push member comprises first and second grooves;
the trigger comprises:
a first shaft portion that extends inwardly from the first trigger arm and that is received in the first shaft receiving groove; a second shaft portion that extends inwardly from the second trigger arm and that is received in the second shaft receiving groove;
a first hand that extends inwardly from the first shaft portion and that is received in the first push member groove; and,
a second hand that extends inwardly from the second shaft portion and that is received in the second push member groove; and,
the extendable pole mechanism is adjustable by pivoting the trigger about its first and second shaft portions with respect to the housing, to cause the push member to slide with respect to the housing.

19. The extendable pole mechanism of claim 18 wherein:
the first and second arms of the trigger, the first and second arms of the cam lever, and the first and second arms of the cam holder are substantially parallel when the extendable pole mechanism is in the use condition.

20. The extendable pole mechanism of claim 19 wherein:
the cam lever second surface is a shoulder surface formed at a proximal end of the first cam lever arm;
the cam lever comprises a third surface that is a shoulder surface formed at a proximal end of the second cam lever arm;
the cam holder first contact surface is formed on a first hand that extends from a distal end of the first cam holder arm;
the cam holder comprises a second contact surface that is formed on a second hand that extends from a distal end of the second cam holder arm;
the cam lever third surface contacts the cam holder second contact surface;
the extendable pole mechanism is adjustable by pivoting the trigger about its first and second shaft portions with respect to the housing, to cause the push member to slide with respect to the housing, to cause the cam lever to pivot about its third surface on the second contact surface of the cam holder with respect to the housing between the use condition and the adjustment condition.

* * * * *